US011887124B2

(12) United States Patent
Somani et al.

(10) Patent No.: US 11,887,124 B2
(45) Date of Patent: Jan. 30, 2024

(54) SYSTEMS, METHODS AND COMPUTER PROGRAM PRODUCTS FOR SECURING ELECTRONIC TRANSACTIONS

(71) Applicant: MASTERCARD INTERNATIONAL INCORPORATED, Purchase, NY (US)

(72) Inventors: Amit Somani, Mandsaur (IN); Padma Jadav, Vadodara (IN); Raviraj Bhatt, Vadodara (IN); Hemant Arora, Pune (IN); Jaipal Singh Kumawat, Sikar (IN); Ajay Panwar, Gurgaon (IN); Sourabh Rajput, Gwalior (IN); Paras Rashmikant Vanjara, Ahmedabad (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 82 days.

(21) Appl. No.: 17/104,267

(22) Filed: Nov. 25, 2020

(65) Prior Publication Data

US 2021/0158360 A1    May 27, 2021

(30) Foreign Application Priority Data

Nov. 26, 2019   (IN) .............................. 201911048233

(51) Int. Cl.
*G06Q 20/40* (2012.01)
*H04L 9/40* (2022.01)
*G06Q 20/42* (2012.01)

(52) U.S. Cl.
CPC ....... *G06Q 20/4016* (2013.01); *G06Q 20/425* (2013.01); *H04L 63/0838* (2013.01); *H04L 63/1416* (2013.01); *H04L 63/1483* (2013.01)

(58) Field of Classification Search
CPC .... G06Q 20/4016; G06Q 20/40; G06Q 20/38; G06Q 20/00; G06Q 20/425; G06Q 20/42;
(Continued)

(56) References Cited

U.S. PATENT DOCUMENTS

2006/0123464 A1*  6/2006  Goodman ........... H04L 63/1466
                                                  726/2
2007/0153733 A1*  7/2007  Kim ................... H04W 74/0866
                                                  370/329
(Continued)

*Primary Examiner* — Namrata Boveja
*Assistant Examiner* — Divesh Patel
(74) *Attorney, Agent, or Firm* — Talem IP Law, LLP

(57) ABSTRACT

The invention provides systems, methods and computer program products for securing electronic transactions and users of electronic transaction services from phishing attacks by malicious attackers and fraudsters. A terminal device receives a first data communication comprising an OTP associated with a requested electronic transaction, and identifies a validity period associated with the OTP. The terminal device responds to detection of a second data communication between the terminal device and a remote entity during the identified validity period, by extracting content from the second data communication. The extracted content is analyzed and a risk decision is generated based on output of the analysis of the extracted content. The risk decision determines whether the remote entity comprises, or is controlled by, a malicious attacker. Responsive to the risk decision determining that the remote entity comprises, or is controlled by, a malicious attacker, the terminal device may initiate a risk mitigation process.

12 Claims, 10 Drawing Sheets

(58) Field of Classification Search
CPC . G06Q 20/385; H04L 63/0838; H04L 63/083; H04L 63/1416; H04L 63/14; H04L 63/1483; H04L 63/1441; H04L 63/1433
See application file for complete search history.

(56) References Cited

U.S. PATENT DOCUMENTS

| | | | |
|---|---|---|---|
| 2009/0172775 A1* | 7/2009 | Mardikar | H04L 9/3228 726/2 |
| 2015/0215310 A1* | 7/2015 | Gill | H04L 63/0838 726/5 |
| 2019/0306159 A1* | 10/2019 | Agarwal | H04L 63/0838 |

* cited by examiner

US 11,887,124 B2

SYSTEMS, METHODS AND COMPUTER PROGRAM PRODUCTS FOR SECURING ELECTRONIC TRANSACTIONS

TECHNICAL FIELD

The present invention relates to the field of electronic transactions, and more specifically to systems, methods and computer program products for securing electronic transactions, and users of electronic transaction services, from phishing attacks by malicious attackers and fraudsters.

BACKGROUND

The prevalence of e-commerce and electronic payment transactions has led to a significant increase in security threats to electronic transactions. An increasingly prevalent threat is presented by "phishing" activities—where a target or targets are contacted by email, voice calls, text messages or data messages by a malicious attacker or fraudster, posing as a legitimate institution or legitimate individual to lure target(s) into providing sensitive data such as personally identifiable information, banking details, payment card or payment account details, and passwords or passcodes. After obtaining the sensitive data, the malicious attacker or fraudster uses the misappropriated sensitive data to access the target(s) electronic accounts—resulting in identity theft and/or financial loss to the target(s). Phishing attacks are routinely effected through voice based calls to the target ("vishing"), or through emails, text messages, data messages or other forms of network communication between a remote entity operated or controlled by a malicious attacker or a fraudster on one side, and a target on the other.

FIG. 1 illustrates a system environment 100 including entities involved in a typical phishing attack. System environment 100 includes a user 102 initiating an electronic transaction through terminal device 104. Terminal device 104 may include a mobile communication device 104a or a computing device 104b having voice, data processing and network communication capabilities. The electronic transaction under implementation involves a payment account associated with user 102 and maintained at issuer institution 110—and user 102 communicates with and sends transaction initiation instructions to issuer institution 110 through network 106. In a phishing attack within system environment 100, a fraudster 108 interacts with user 102 through voice or electronic communications that seek to deceive user 102 regarding the source of such communications, and to try and obtain the user's sensitive data. Upon successfully obtaining the user's sensitive data, fraudster 108 uses the misappropriated sensitive data to unauthorizedly access a payment account maintained by user 102 at issuer institution 110, and to route or transfer payments from the payment account maintained by user 102 at issuer institution 110, to an unauthorized destination 112 (e.g. a payment account operatable/controllable/accessible by fraudster 108).

With the convergence of telecommunication capabilities and data communication capabilities within mobile telecommunication devices (e.g. mobile phones and smartphones), electronic transaction systems and financial institutions have sought to improve transaction security by implementing dynamic passcode based (i.e. one-time-passcode/one-time-password (OTP) based) identity authentication—wherein responsive to an entity initiating an electronic transaction that involves an electronic account, an OTP associated with the transaction is transmitted to a device or address associated with an authorized user of the electronic account. The transaction can only be completed if the user initiating the electronic transaction is able to retrieve the OTP from such device or address, and transmit it back as proof of identity.

FIG. 2 illustrates method steps that fraudsters routinely use for misappropriating a transaction OTP or other sensitive user information within a system environment 100 of the kind illustrated in FIG. 1.

Step 202 includes a fraudster 108 obtaining contact information and/or user information for a user 102 who has a payment account maintained at issuer institution 110—wherein user 102 is the intended target of a phishing attack.

At step 204, fraudster 108 contacts user 102 and impersonates an official of issuer institution 110 or any other legitimate entity/official. At step 206, fraudster 108 convinces user 102 that there is an urgent need for user 102 to share sensitive information with fraudster 108. Examples of sensitive information may include payment account information, login information and/or OTP information of user 102. Fraudster 108 may also or alternately convince user 102 to carry out a payment transaction transferring a payment from issuer institution 110 to an unauthorized destination 112 that is operated, controlled or accessible by fraudster 108.

At step 208, responsive to user 102 following instructions received from fraudster 108, or responsive to user 102 sharing sensitive information with fraudster 108—a payment transaction is fraudulently implemented, with the effect of transferring payment from a payment account associated with user 102 from issuer institution 110 to an unauthorized destination 112 that is operated, controlled or accessible by fraudster 108.

There is therefore presently a need for solutions that prevent phishing attacks—for securing electronic transactions and preventing misappropriation of sensitive information (in particular transaction OTPs), by fraudsters.

BRIEF SUMMARY

The invention provides systems, methods and computer program products for securing electronic transactions and users of electronic transaction services from phishing attacks by malicious attackers and fraudsters.

The invention provides a method for securing electronic transaction one-time-passwords (OTPs) against phishing attacks. The method comprises implementing at a terminal device, the steps of (i) receiving at the terminal device, a first data communication comprising an OTP associated with a requested electronic transaction, (ii) identifying a validity period associated with the OTP, (iii) responding to detection of a second data communication between the terminal device and a remote entity during the identified validity period associated with the OTP, by extracting content from the second data communication, (iv) analyzing the extracted content and generating a risk decision based on output of the analysis of the extracted content, wherein the risk decision determines whether the remote entity comprises, or is controlled by, a malicious attacker; and (v) responsive to the risk decision determining that the remote entity comprises, or is controlled by, a malicious attacker, initiating a risk mitigation process.

In an embodiment of the method, the validity period associated with the OTP is a time period within which the OTP is capable of identity authentication for the purposes of the requested electronic transaction. The validity period associated with the OTP may be determined based on content of the first data communication.

The step of analyzing the content extracted from the second data communication may comprise presenting the extracted content as input to one or more risk scoring data models that are configured to score a likelihood that the remote entity comprises, or is controlled by, a malicious attacker.

In a method embodiment, the risk mitigation process comprises any of (i) initiating a display of a security threat alert on a display of the terminal device, (ii) initiating transmission of a security threat alert to an issuer server involved in the electronic transaction, (iii) terminating the electronic transaction, (iv) invalidating the received OTP, (v) terminating communication between the terminal device and the remote entity, (vi) adding the remote entity to a blacklist, and (vii) updating one or more risk scoring data models based on parameters of the second data communication.

The invention also provides a system for securing electronic transaction one-time-passwords (OTPs) against phishing attacks. The system comprises a terminal device configured for implementing the steps of (i) receiving at the terminal device, a first data communication comprising an OTP associated with a requested electronic transaction, (ii) identifying a validity period associated with the OTP, (iii) responding to detection of a second data communication between the terminal device and a remote entity during the identified validity period associated with the OTP, by extracting content from the second data communication, (iv) analyzing the extracted content and generating a risk decision based on output of the analysis of the extracted content, wherein the risk decision determines whether the remote entity comprises, or is controlled by, a malicious attacker, and (v) responsive to the risk decision determining that the remote entity comprises, or is controlled by, a malicious attacker, initiating a risk mitigation process.

In an embodiment of the system, the validity period associated with the OTP is a time period within which the OTP is capable of identity authentication for the purposes of the requested electronic transaction. The validity period associated with the OTP may be determined based on content of the first data communication.

In a further system embodiment, analyzing the content extracted from the second data communication comprises presenting the extracted content as input to one or more risk scoring data models that are configured to score a likelihood that the remote entity comprises, or is controlled by, a malicious attacker.

The system may be configured such that the risk mitigation process comprises any of (i) initiating a display of a security threat alert on a display of the terminal device, (ii) initiating transmission of a security threat alert to an issuer server involved in the electronic transaction, (iii) terminating the electronic transaction, (iv) invalidating the received OTP, (v) terminating communication between the terminal device and the remote entity, (vi) adding the remote entity to a blacklist, and (vii) updating one or more risk scoring data models based on parameters of the second data communication.

The invention further provides a computer program product for securing electronic transaction one-time-passwords (OTPs) against phishing attacks. The computer program product comprises a non-transitory computer readable medium having a computer readable program code embodiment therein, the computer readable program code comprising instructions for (i) receiving at a terminal device, a first data communication comprising an OTP associated with a requested electronic transaction, (ii) identifying a validity period associated with the OTP, (iii) responding to detection of a second data communication between the terminal device and a remote entity during the identified validity period associated with the OTP, by extracting content from the second data communication, (iv) analyzing the extracted content and generating a risk decision based on output of the analysis of the extracted content, wherein the risk decision determines whether the remote entity comprises, or is controlled by, a malicious attacker, and (vi) responsive to the risk decision determining that the remote entity comprises, or is controlled by, a malicious attacker, initiating a risk mitigation process.

DETAILED DESCRIPTION

The invention provides systems, methods and computer program products for securing electronic transactions and users of electronic transaction services from phishing attacks by malicious attackers or fraudsters.

Figure 1:
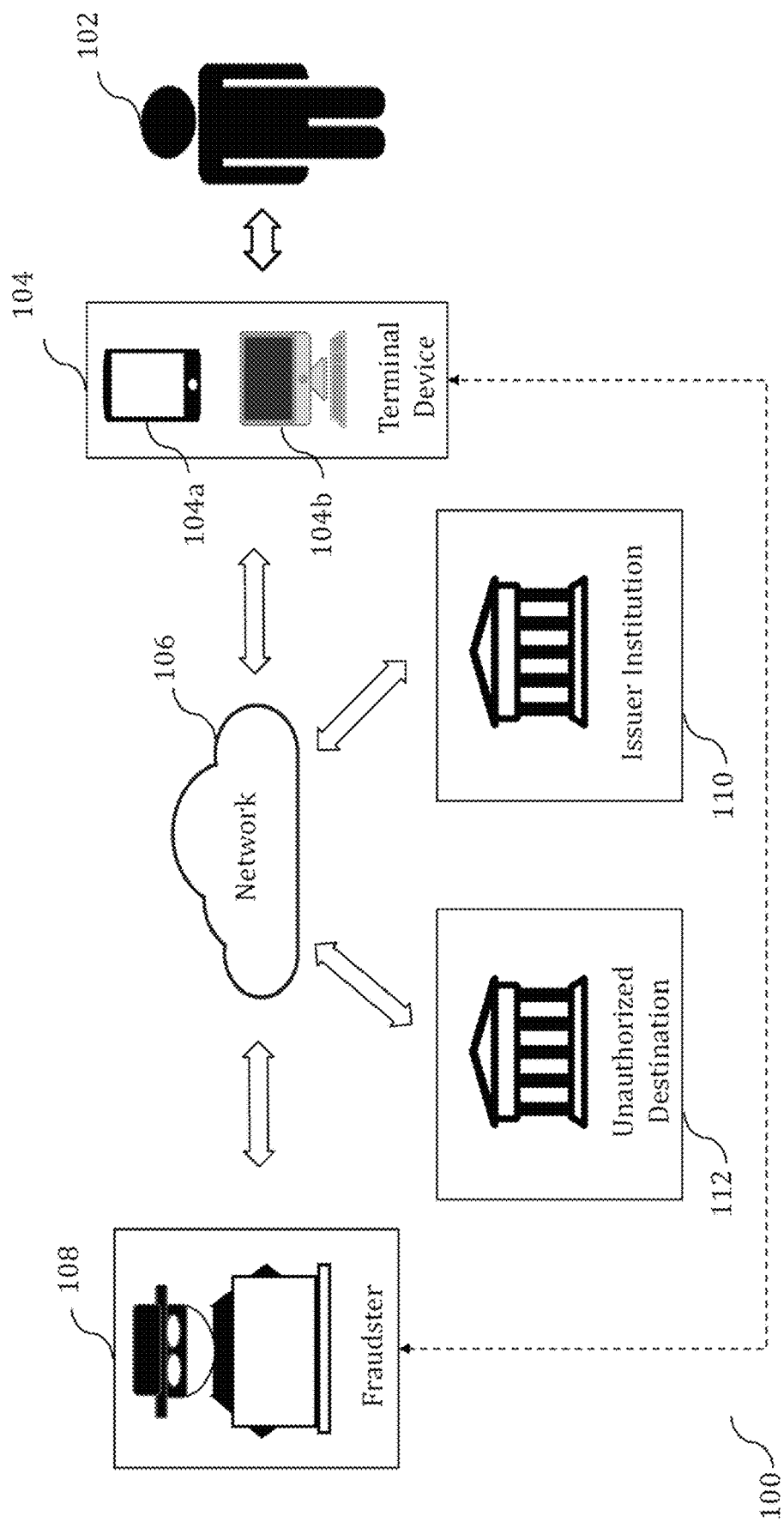
FIG. 1 illustrates a system environment including entities involved in a phishing attack, as known in the prior art.
Figure 2:
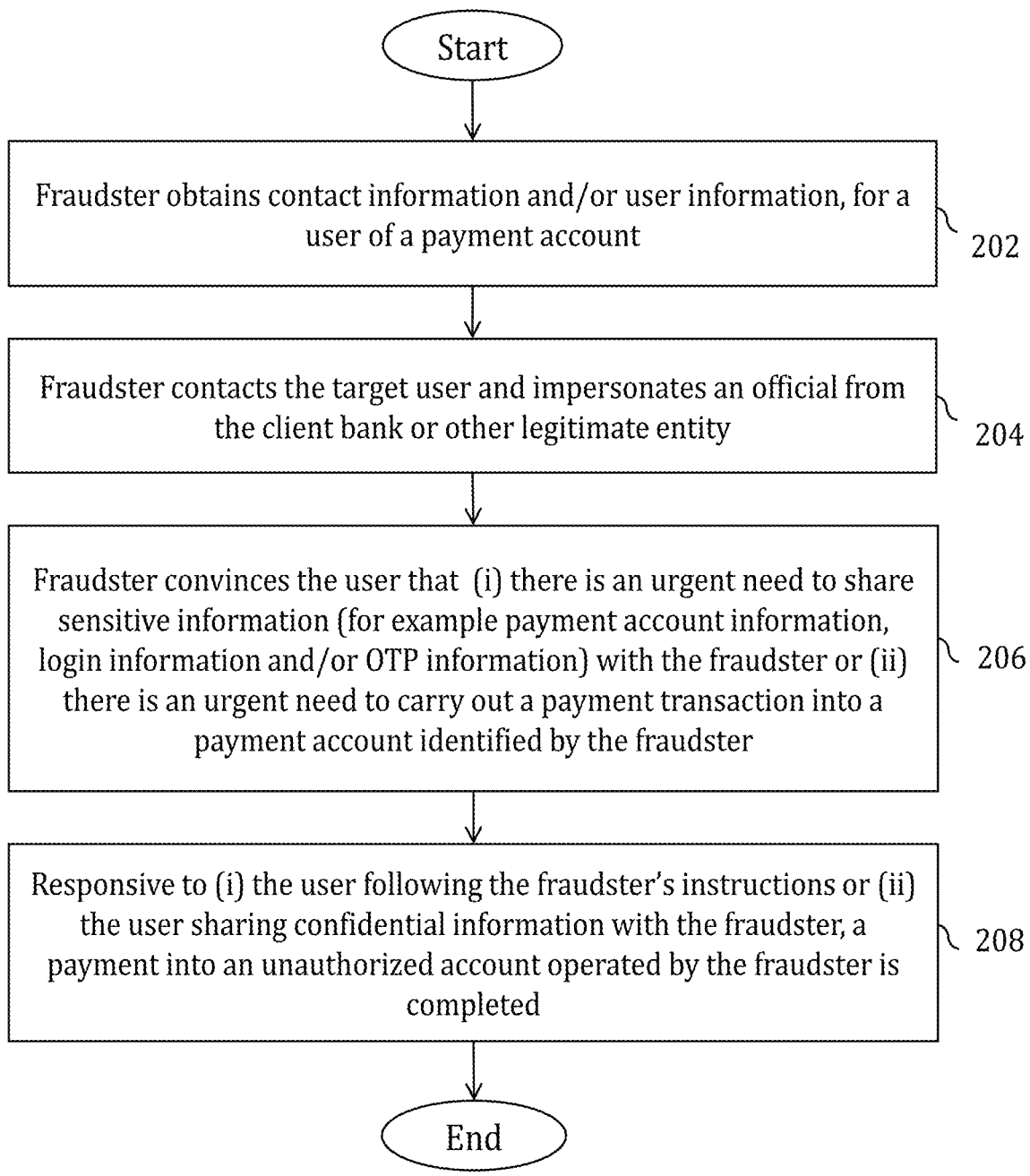
FIG. 2 is a flow chart illustrating a method for misappropriation of a transaction OTP or other sensitive user information, by a fraudster, as known in the prior art.
Figure 3A:
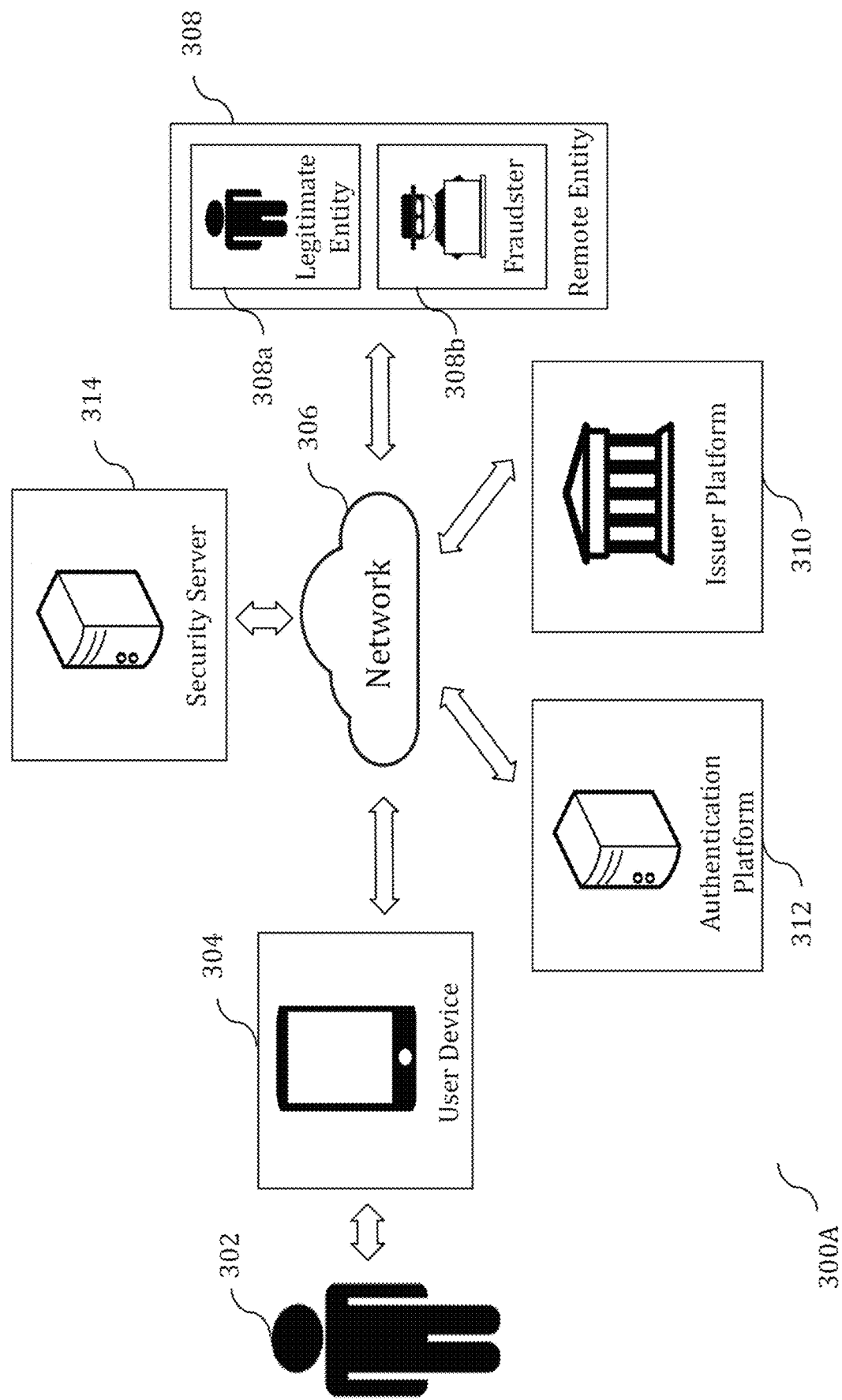
FIG. 3A illustrates a system environment configured to implement the present invention.

FIG. 3A illustrates a system environment 300A configured to implement the teachings of the present invention. System environment 300A includes a user 302 who initiates an electronic transaction (for example an electronic payment transaction towards goods or services requested by user 302) through user device 304. User device 304 may include any terminal device having voice and/or data processing capabilities. In a particular embodiment, the terminal device may include any of a mobile communication device, a smartphone or other computing device. Implementing the electronic transaction involves a payment account associated with user 302 and maintained by an issuer bank. The issuer bank and the payment accounts associated with the electronic transaction may be operated and controlled through issuer platform 310.

Figure 3B:
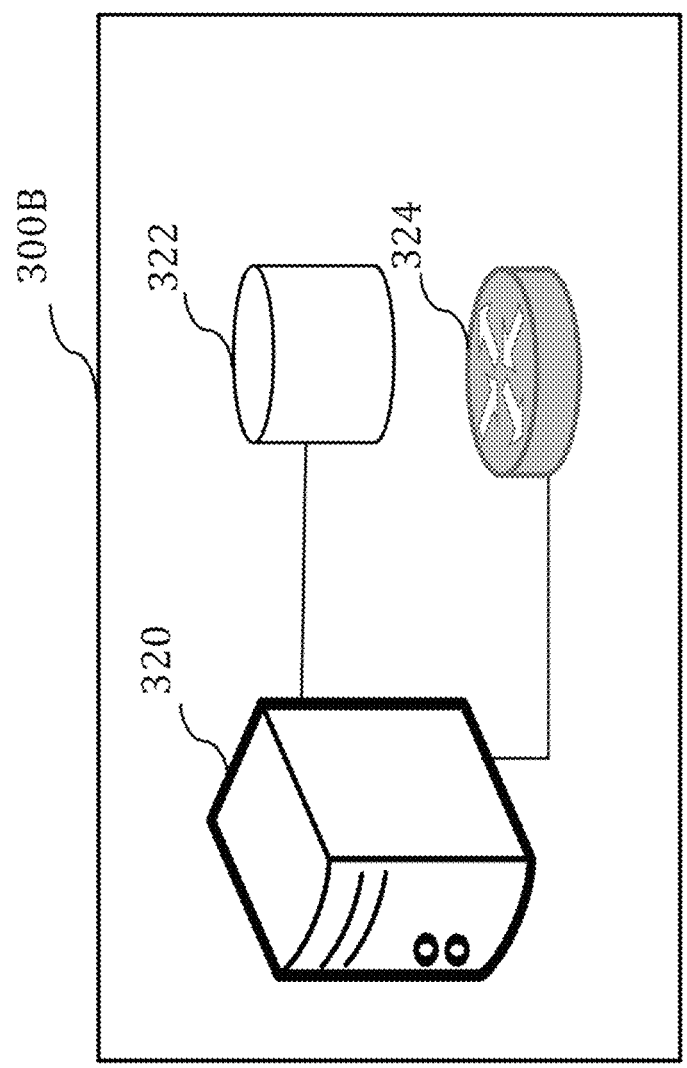
FIG. 3B illustrates an exemplary embodiment of a server platform of a type that may be used to implement an issuer platform or an authentication platform in accordance with the teachings of the present invention.

In an embodiment, issuer platform 310 may include a platform 300B of the type illustrated in FIG. 3B. In such embodiment, issuer platform includes a platform server 320, platform database 322 and platform gateway interface 324. For the purposes of this embodiment, the platform server 320 may include at least one processor, and one or more transitory and/or non-transitory memories. Platform server 320 may be configured (i) to maintain payment accounts held with the issuer bank, (ii) to enable electronic access to payment accounts held with the issuer bank, and/or (iii) to enable electronic payment transactions involving payment accounts held with the issuer bank. For the purposes of the embodiment, platform database 322 may include a non-transitory memory based database, configured to store data records corresponding to users and electronic payments accounts that are maintained at issuer platform 310. In this embodiment, platform gateway interface 324 may include a hardware or software network gateway configured to enable transmission and receipt of communications by issuer platform 310.

System environment 300A also includes an authentication platform 312, that is configured to enable identity authentication of individuals/entities requesting initiation of electronic payment transactions through one or more payment accounts maintained at issuer platform 310. The objective of identity authentication is to ensure that such individual/entity is in fact authorized to initiate an electronic payment transaction through such one or more payment accounts. In an embodiment, authentication platform 312 is a platform configured to authenticate a user identity through OTP based identity authentication. In embodiment of this type, user 302 initiates an electronic transaction that involves an electronic payment account maintained at issuer platform 310 through user device 304. Authentication platform 312 is configured to respond by generating an OTP associated with the initiated electronic transaction, and to transmit the generated OTP to a registered device or address associated with an authorized user of the electronic payment account (for example the payment account holder). The transaction is completed only when the user 302 who has initiated the electronic payment transaction retrieves the generated OTP from the registered device or address and transmits it back to issuer platform 310 or to authentication platform 312 through user device 304 from which the electronic transaction has been initiated.

In an embodiment, authentication platform 312 may include a platform 300B of the type illustrated in FIG. 3B. In such embodiment, authentication platform 312 includes platform server 320, platform database 322 and platform gateway interface 324. In this embodiment, platform server 320 may include at least one processor, and one or more transitory and/or non-transitory memories, and may be configured (i) to generate OTPs associated with one or more electronic transactions, (ii) to initiate transmission of the OTPs to authorized users of payment accounts involved in the one or more electronic transactions, (iii) to match OTP data received from initiators of the electronic transactions against OTPs that have been generated in connection with said electronic transactions, and (iv) to generate identity authentication decisions (i.e. one or more determinations whether an initiator of an electronic transaction is an authorized user of a payment account involved in the electronic transaction) based on the results of such matching. In this embodiment, platform database 322 may include a non-transitory memory based database, configured to store data records corresponding to OTPs that have been generated in connection with individual transactions, OTPs received from initiators of the electronic transactions, and/or identity authentication decisions that have been generated in connection with electronic transactions based on OTP matching.

Platform gateway interface 324 may include a hardware or software network gateway configured to enable transmission and receipt of communications by authentication platform 312.

As shown in FIG. 3A, system environment 300A also includes a remote entity 308 that may seek to interface with user 302 through data communications between remote entity 308 and user device 304. The remote entity may include either of a legitimate entity 308a or a fraudster 308b. A legitimate entity 308a may be understood as any individual, device or software program that participates in voice or data communication with user device 304 for legitimate purposes i.e. for purposes other than misappropriating sensitive electronic transaction related data from user 302 or user device 304. A fraudster 308b is as any individual, device or software program that initiates or participates in voice or data communication with user device 304 for the fraudulent purpose of misappropriating sensitive electronic transaction related data from user 302 or user device 304.

System environment 300A may also include security server 314, wherein security server 314 is a cloud based or network based server that may be configured to store and periodically update data models and blacklists or whitelists that can be used for determining whether a remote entity 308 that is in communication with user device 304 is a legitimate entity or a fraudster. In particular embodiments, security server 314 is configured to enable user device 304 to, periodically or on-demand, download updated data models and/or black lists or whitelists from security server 314 to enable user device 304 to determine whether a remote entity 308, that is in communication with user device 304, is a legitimate entity or a fraudster. Security server 314 may additionally be configured to, periodically or on-demand, receive data from one or more user devices 304 concerning fraudsters and/or legitimate entities that said user device(s) 304 have identified, and to use such data to update the data models and/or blacklists or whitelists stored on security server 314.

Each of user device 304, remote entity 308, issuer platform 310, authentication platform 312 and security server 314, are communicably coupled with network 306. Network 306 may include a voice network configured to enable voice communication between remote entities, a data network configured to enable data communication between remote entities, or a hybrid network including a combination of the two. In an embodiment, network 306 includes any of a local area network, wide area network, internetwork (such as the Internet), or any other network including a connected plurality of intercommunicating data processing devices or entities.

Figure 4:
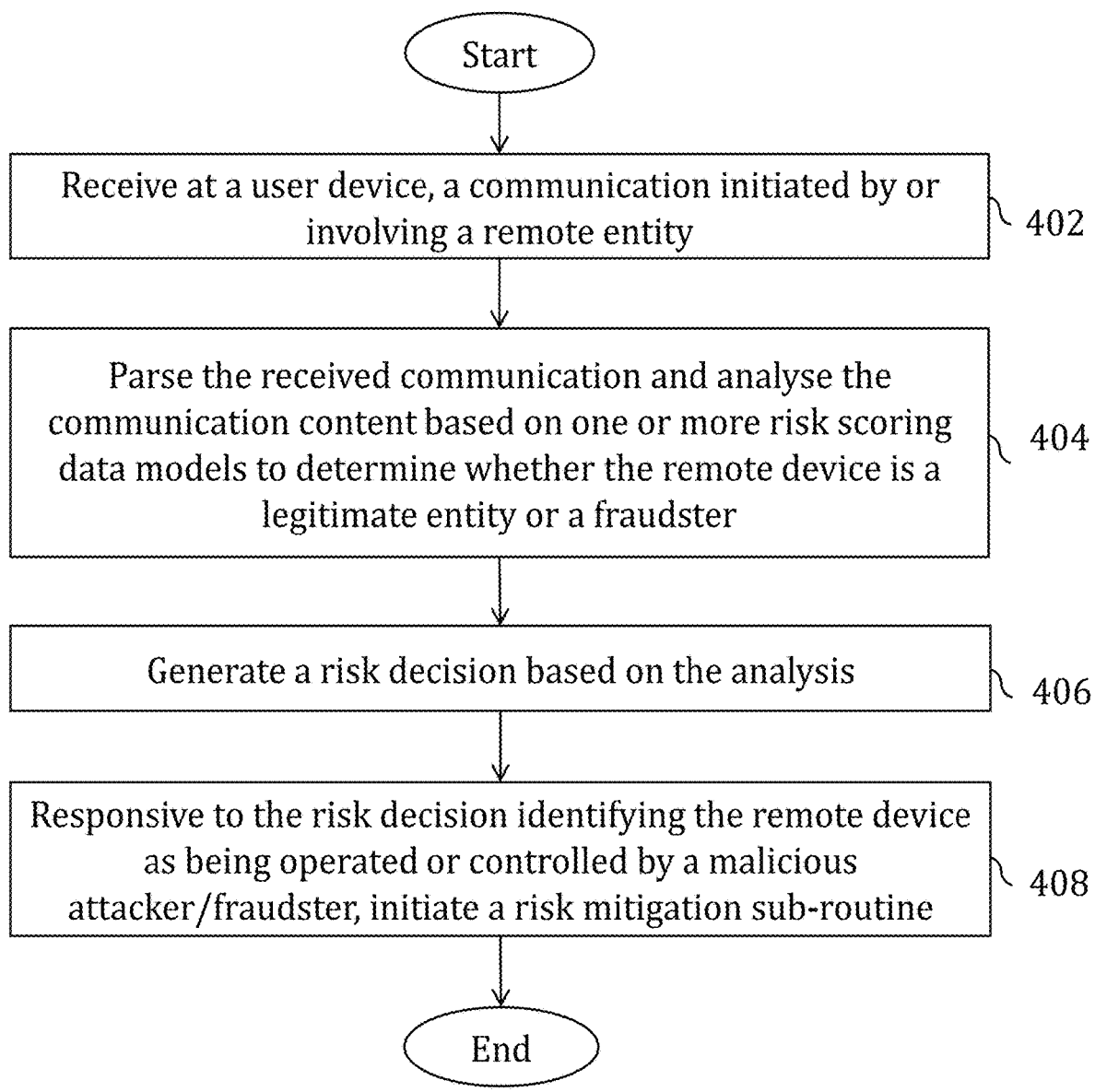
FIG. 4 is a flowchart illustrating a method of implementing data model based analytics for securing an electronic transaction against phishing attacks.

FIG. 4 is a flowchart illustrating a method of implementing data model based analytics for securing an electronic transaction against phishing attacks. The method of FIG. 4 may be implemented within system environment 300A. In a particular embodiment, the method of FIG. 4 may be implemented within user device 304. In such embodiment, user device 304 may be specifically configured to implement one or more of the method steps of FIG. 4.

Step 402 includes receiving a communication initiated by or involving remote entity 308. The communication may include a voice communication, a data communication, or signals or data packets corresponding thereto, and may include either a stand-alone communication or a part of a larger communication. The communication may have been initiated by remote entity 308 or may have been initiated by user 302 operating user device 304.

Step 404 includes parsing the received communication and analyzing content extracted from the communication, based on one or more risk scoring data models that are configured to score a likelihood or risk of remote entity 308 being either a legitimate entity or a fraudster.

Executing step 404 may include implementation of multiple sub-routines, including without limitation one or more of:

A signal interpretation sub-routine, performed at the physical layer of user device 304, wherein data modulated onto a received voice signal or data signal is demodulated and converted into voice content or data content. The physical layer of user device 304 consists of the electronic circuit transmission technologies of the device—which manages and implements bit-level transmission between user device 304 and other different devices, and which supports electrical or mechanical interfaces connecting to the physical medium for synchronized communication.

A data parsing sub-routine, performed at the application layer of user device 304, wherein the voice content or data content is parsed by a processor within user device 304 and the parsing may include one or more of syntactic parsing, semantic parsing and/or context based parsing to extract from the voice content or data content, parameters defining the content of the communication.

A data analysis sub-routine, performed at the application layer of user device 304, wherein the parameters that have been extracted in the data parsing steps are provided as input to one or more data models that are configured to process such parameters as inputs, and to output a risk score or other data output that represents a risk or likelihood that remote entity 308 is a fraudster or a malicious attacker.

A risk decision generation sub-routine, performed at the application layer of user device 304, wherein the data output received from the data analysis sub-routine is used to generate a decision regarding whether remote entity 308 is a fraudster or malicious attacker or whether remote entity 308 is a legitimate entity.

For the purposes of implementing the data analysis sub-routine discussed briefly above, the data models that are used may include data models that have been generated, modified or refined based on one or machine learning algorithms. One or more of said data models may have been generated, modified or refined based on identified correlations between (i) financial terms, keywords or other content within one or more prior received voice or data communications or training datasets, and (ii) whether a remote entity(ies) corresponding to said one or more prior received voice or data communications has been identified as a malicious attacker or fraudster, or as a legitimate entity. In an embodiment, (i) one or more data models ("financial data model(s)") may be configured to determine based on parsed content of communications from or with remote entity 308, whether content extracted from the communication under analysis includes terms relating to financial transactions, electronic transactions, or payment transactions, and/or (ii) one or more data models ("phishing data model(s)") may be configured to determine, based on parsed content of communications from or with remote entity 308, whether content extracted from the communication under analysis includes terms used in previously identified phishing attacks or in phishing attacks identified within training datasets.

In an exemplary embodiment of the method of FIG. 4, the one or more data models used for the purposes of the data analysis sub-routine may be configured such that:

The analysis at step 404 of FIG. 4 generates a high/higher risk score for content that outputs a higher score or higher match both on a financial data model and a phishing data model, The analysis at step 404 of FIG. 4 generates a medium risk score for content that outputs a higher score or higher match on a financial data model but a lower score or lower match on a phishing data model, and/or The analysis at step 404 of FIG. 4 generates a low risk score for content that outputs a low score or low match on a financial data model and a low score or low match on a phishing data model.

Step 406 includes generating a risk decision based on the output of the analysis at step 404. Thereafter, at step 408, responsive to the risk decision identifying the remote entity 308 as being operated or controlled by a malicious attacker or fraudster, user device 304 initiates a risk mitigation sub-routine or process flow, which is discussed in more detail below in connection with FIG. 6.

Figure 5:
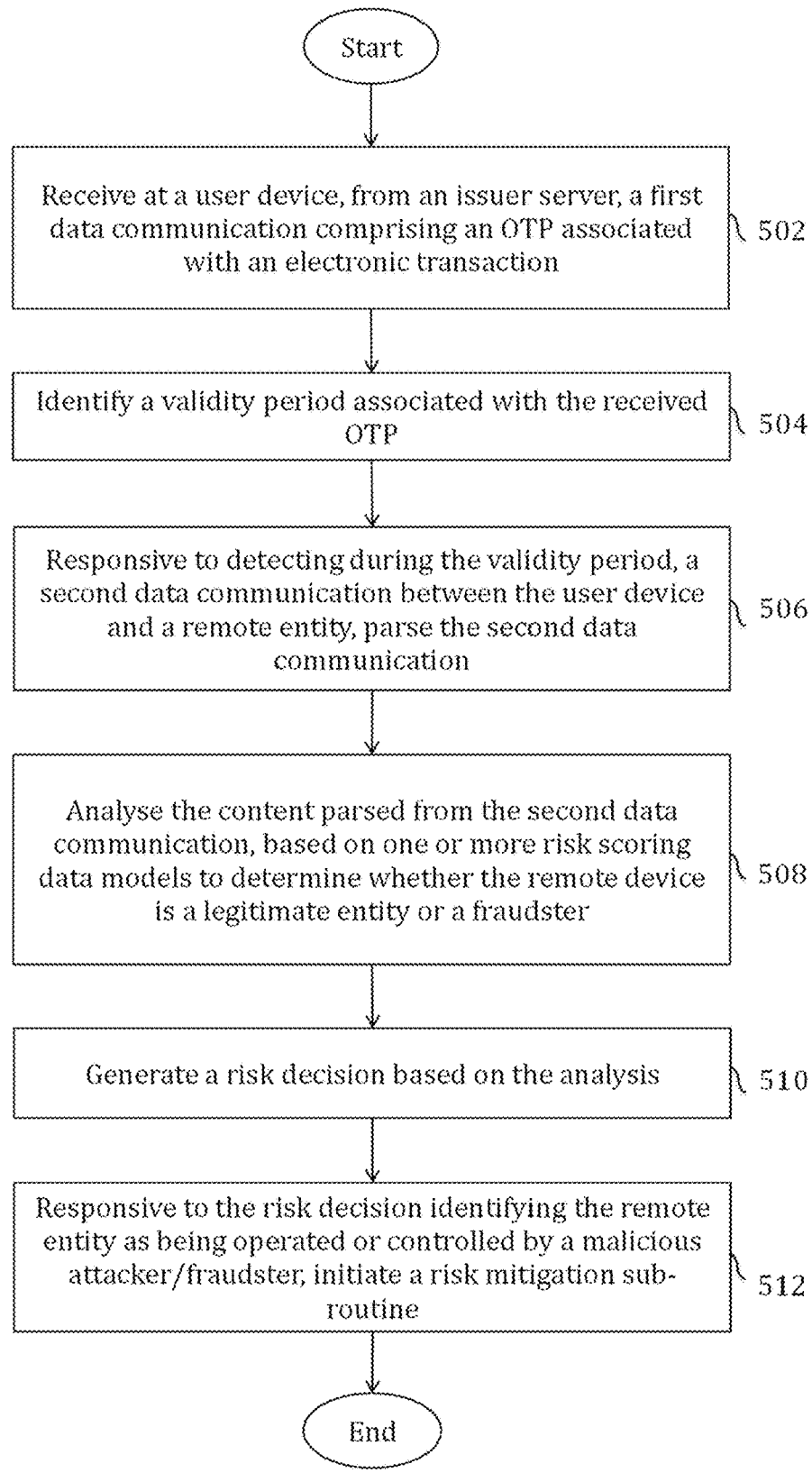
FIG. 5 is a flowchart illustrating a method of securing electronic transaction OTPs against phishing attacks.

FIG. 5 is a flowchart illustrating a method of securing electronic transaction OTPs against phishing attacks.

The method of FIG. 5 may be implemented within system environment 300A. In a particular embodiment, the method of FIG. 5 may be implemented within user device 304. In such embodiment, user device 304 may be specifically configured to implement one or more of the method steps of FIG. 5.

Step 502 includes receiving a first data communication including an OTP associated with an electronic transaction. In an embodiment, the electronic transaction is an electronic payment transaction for transfer of funds from a payor account maintained at issuer platform 310, and the OTP has been generated and transmitted to a user device 304 by authentication server 312 in response to instructions for initiation of the electronic payment transaction having been transmitted from user device 304 to issuer platform 310. The first data communication may include any of a text message, a data message, or a voice message which includes the OTP.

Step 504 includes identifying a validity period associated with the received OTP. The validity period associated with the OTP is a time period within which the OTP is capable of identity authentication (i.e. remains active or valid and within which period, transmission of the OTP back to authentication server 312 will result in successful identification of user 302 as an individual or entity who is authorized to carry out payment transactions through the payor account maintained at issuer platform 310). Subsequent to expiry of the validity period associated with the OTP, the OTP ceases to be active and transmission of the OTP back to authentication server 312 after this period would not result in successful identification of user 302 as an individual or entity who is authorized to carry out payment transactions through the payor account maintained at issuer platform 310. In another embodiment, subsequent to expiry of the validity period associated with the OTP, the initiated electronic payment transaction itself is cancelled or invalidated. Identification of a validity period associated with a received OTP may be based on a validity period specified in the first data communication or in any other data communication received at user device 304, or alternately may be based on a default validity period defined or specified by any of issuer platform 310 or authentication platform 312 or by user device 304 itself.

Step 506 includes responding to detection, during the identified validity period of the received OTP, of a second data communication between the user device and a remote entity, by extracting content from said second data communication. Executing step 506 may include implementation of multiple sub-routines, including without limitation one or more of:

A signal interpretation sub-routine, performed at the physical layer of user device 304, wherein data modulated onto a received voice signal or data signal is demodulated and converted into voice content or data content.

A data parsing sub-routine, performed at the application layer of user device 304, wherein the voice content or data content is parsed by a processor within user device 304. The data parsing sub-routine may include one or more of syntactic parsing, semantic parsing and/or context based parsing to extract from the voice content or data content, parameters defining the content of the second data communication.

Step 508 includes analyzing the content parsed from the second data communication (received at step 506) based on one or more risk scoring data models that are configured to score a likelihood or risk of the remote entity 308 being either a legitimate entity or a fraudster. Executing step 508 may include data analysis performed at the application layer of user device 304, wherein parameters extracted from or corresponding to the content parsed from the second data communication are provided as input to one or more data models that are configured to process such inputs, and to output a risk score or other data output that represents a risk or likelihood that remote entity 308 is a fraudster or a malicious attacker.

For the purposes of implementing the data analysis at step 508, the data models that are used may include data models that have been generated, modified or refined based on one or machine learning algorithms. One or more of said data models may have been generated, modified or refined based on identified correlations between (i) financial terms, keywords or other content within one or more prior received voice or data communications or training datasets, and (ii) whether a remote entity(ies) corresponding to said one or more prior received voice or data communications has been identified as a malicious attacker or fraudster, or as a legitimate entity. In an embodiment, (i) one or more financial data models may be configured to determine whether content extracted from the communication under analysis includes terms relating to financial transactions, electronic transactions, or payment transactions, and/or (ii) one or more phishing data models may be configured to determine whether content extracted from the communication under analysis includes terms used in previously identified phishing attacks or in phishing attacks identified within training datasets.

As discussed previously in connection with FIG. 4, in an exemplary embodiment of the method of FIG. 5, the one or more data models used for the purposes of the analysis at step 508 may be configured such that:

The analysis at step 508 of FIG. 5 generates a high/higher risk score for content that outputs a higher score or higher match both on a financial data model and a phishing data model, The analysis at step 508 of FIG. 5 generates a medium risk score for content that outputs a higher score or higher match on a financial data model but a lower score or lower match on a phishing data model, and/or The analysis at step 508 of FIG. 5 generates a low risk score for content that outputs a low score or low match on a financial data model and a low score or low match on a phishing data model.

In other embodiments of the method, the analysis at step 508 of FIG. 5 may consider other parameters including (i) whether data corresponding to the remote entity 308 (for example a phone number or contact information corresponding to the remote entity) has been previously stored within user device 304, and (ii) whether the remote entity has been identified in any whitelist or blacklist maintained locally at user device 304 or maintained remotely at security server 314.

Step 510 includes generating a risk decision based on output of the analysis at step 508. Generation of the risk decision may be performed at the application layer of user device 304. In an embodiment, the data output received from the analysis at step 508 is used to generate a decision regarding whether remote entity 308 is a fraudster or malicious attacker, or whether remote entity 308 is a legitimate entity.

Thereafter step 512 includes responding to a risk decision (from step 510) that identifies remote entity 308 as being operated or controlled by a malicious attacker or fraudster, by initiating a risk mitigation sub-routine or process flow.

Figure 6:
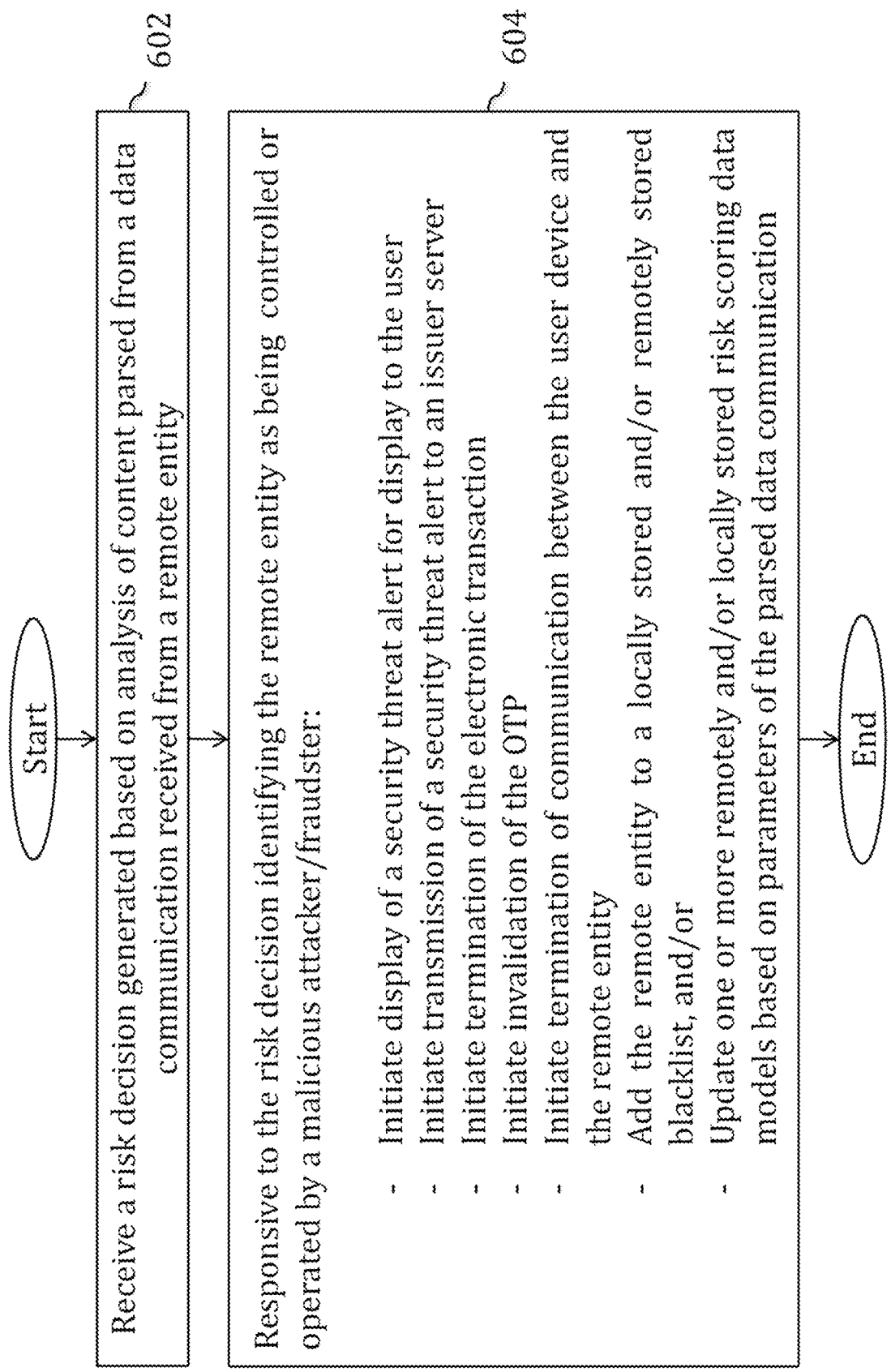
FIG. 6 is a flowchart illustrating a method of implementing one or more security responses to a risk decision generated in accordance with the method of FIG. 5.

FIG. 6 is a flowchart illustrating a method of implementing one or more security responses to a risk decision generated in accordance with the method of FIG. 5 (for example, one or more risk mitigation processes). In an embodiment, the one or more security responses of FIG. 6 include part or the whole of the risk mitigation sub-routine or process flow discussed above in connection with the methods of FIGS. 4 and 5. The method of FIG. 6 may be implemented partly or wholly at user device 304. In an embodiment, the method steps of FIG. 6 may be implemented partly at user device 304 and partly at security server 314.

The method of FIG. 6 commences at step 602, which includes receiving a risk decision that has been generated based on an analysis of content parsed from a data communication received from a remote entity 308. In an embodiment, the received risk decision is a risk decision generated at step 406 (of FIG. 4) or at step 510 (of FIG. 5).

Responsive to the risk decision identifying the remote entity 308 as being controlled or operated by a malicious attacker or fraudster, step 604 includes one or more of:

Initiating a display of a security threat alert to user 302—for example on a display of user device 304;

Initiating transmission of a security threat alert to an issuer server within issuer platform 310—for example, from user device 304 to said issuer server;

Initiating termination of the electronic transaction that is under implementation. Termination of the electronic transaction that is being implemented, may be achieved by any one or more of (i) blocking or rejecting all subsequent incoming data messages or data communications that are related to the electronic transaction, (ii) blocking or restricting all subsequent outgoing data messages or data communications that are related to the electronic transaction, and (iii) transmitting an instruction to the issuer server or any other network entity to block or cancel the ongoing electronic transaction;

Initiating invalidation of an OTP that has been transmitted to user device 304 for the purposes of identity authentication as part of an electronic transaction under implementation—for example, by transmitting an invalidation request from user device 304 to issuer platform 310 or authentication platform 312;

Initiating termination of communication between user device 304 and remote entity 308—for example, by terminating a voice call or by blocking further text or data or voice based communication between user device 304 and remote entity 308;

Adding the remote entity to a blacklist that is locally stored at user device 304 or to a blacklist that is remotely stored at security server 314, and/or Updating one or more remotely and/or locally stored data models based on parameters of a parsed data communication in connection whereof, the risk decision of step 602 has been generated.

Figure 7:
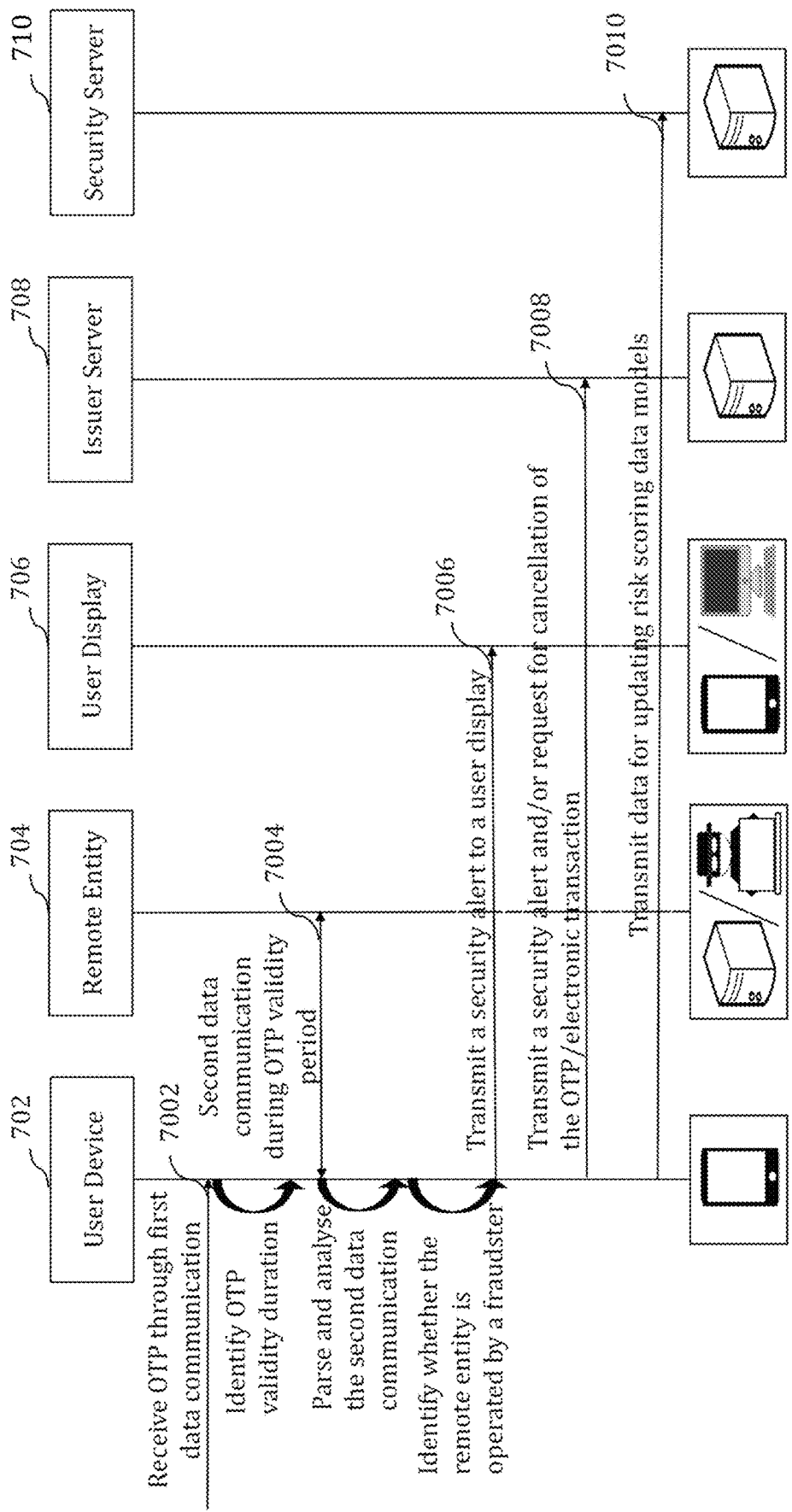
FIG. 7 includes a communication flow diagram illustrating communication flow between the system entities of FIG. 3A, for implementing an embodiment of the method of FIG. 5.

FIG. 7 is a communication flow diagram illustrating communication flow between system entities, for implementing an embodiment of the method of FIG. 5.

Step 7002 includes receiving at user device 702, a first data communication including an OTP associated with an electronic transaction. In an embodiment, the electronic transaction is an electronic payment transaction for transfer of funds from a payor account maintained by issuer server 708, wherein the OTP has been generated and transmitted to user device 702 by an authentication platform (of the type previously described in connection with FIGS. 3A and 3B) in response to instructions for initiation of the electronic payment transaction having been transmitted from user device 702 to issuer server 708. The first data communication may include any of a text message, a data message, or a voice communication which includes the OTP.

User device 702 identifies a validity period associated with the received OTP. As discussed above, the validity period associated with the OTP is a time period within which the OTP remains active or valid, or after which, the initiated electronic payment transaction itself is cancelled or invalidated. Identification of a validity period associated with a received OTP may be effected based on a validity period specified in the first data communication or in any other data communication received at user device 702 or alternately may be based on a default validity period defined or specified by issuer server 708, by an authentication platform that generated the OTP, or by user device 702 itself.

At step 7004, user device 702 detects a second data communication between user device 702 and a remote entity 704—which second data communication occurs during the identified validity period associated with the received OTP. Responsive to detection of the second data communication within the identified validity period, user device 702 parses content from said second data communication, analyses the parsed data and generates a risk decision identifying whether remote entity 704 is operated by a fraudster (for example, based on the method steps described above in connection with FIGS. 4 and 5).

At step 7006, responsive to determining or identifying that remote entity 704 is operated by a fraudster, step 7006 includes transmitting a security alert to a user display 706—for notifying a user who is operating user device 702 that the second data communication involves a remote entity operated by a fraudster, and optionally alerting the user not to share sensitive information and/or the OTP with remote entity 704.

At step 7008, user device 702 transmits a security alert and/or a request for cancellation of the OTP or the electronic transaction that is under implementation, to issuer server 708.

At step 7010, user device additionally transmits to security server 710, data corresponding to the parameters of the second data communication, for updating of risk scoring data models stored at security server 710, and optionally for updating one or more blacklists stored at or by security server 710.

Figure 8:
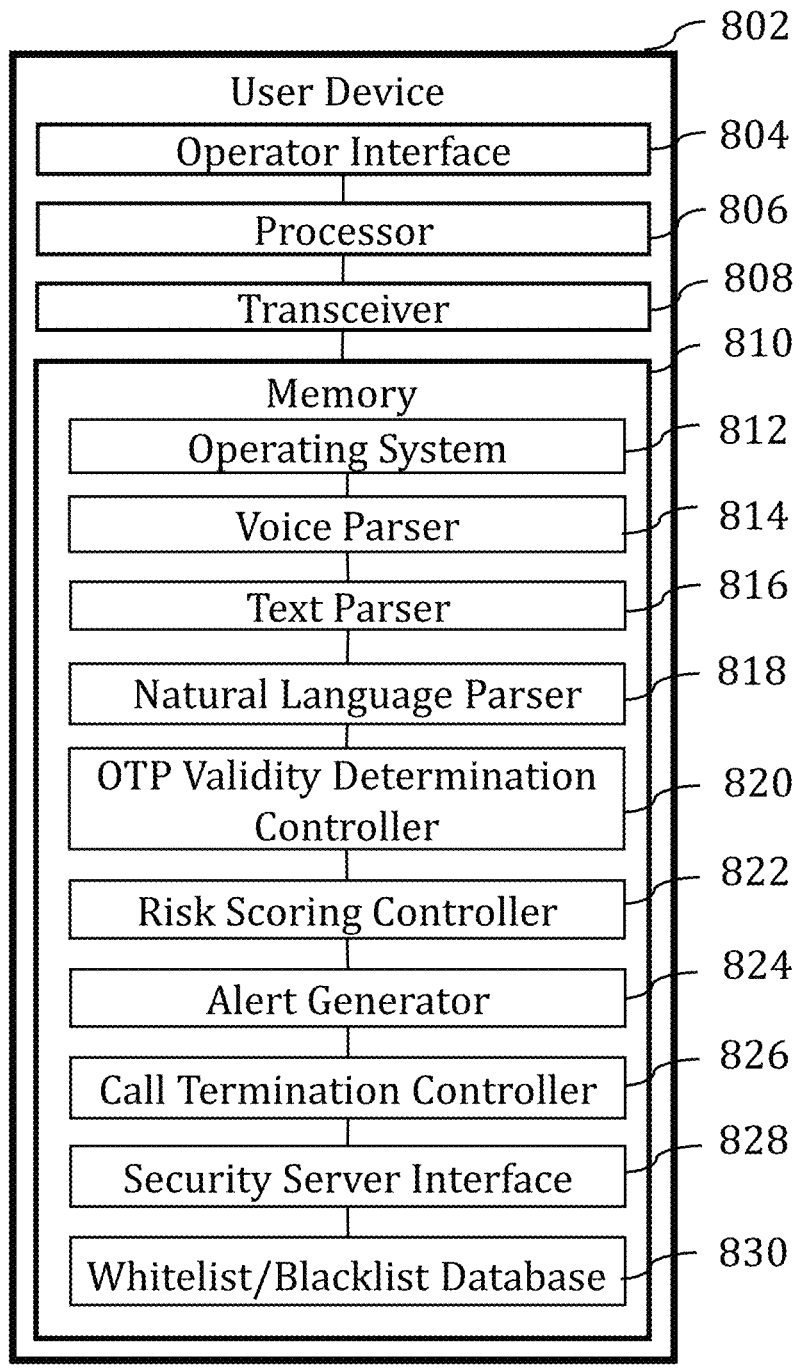
FIG. 8 illustrates an embodiment of a user device configured to implement the teachings of the present invention.

FIG. 8 illustrates an embodiment of a user device 802 configured to implement the teachings of the present invention. It would be understood that user device 802 may include an embodiment of user device 304 of FIG. 3A.

User device 802 may include any processor based device configured for data processing operations and network based communication. In specific embodiments, user device 802 may include any of a computing device, a mobile communication device, a smartphone, or a personal computing device. User device 802 may include (i) an operator interface 804 configured to enable an operator to configure or control user device 802, (ii) a processor 806 configured for data processing operations within user device 802, (iii) a transceiver 808 configured for enabling network communication to and from user device 802, and (iv) a memory 810, which memory 810 may include transitory memory and/or non-transitory memory.

In an exemplary embodiment, memory 810 may have stored therewithin, (i) an operating system 812 configured for managing device hardware and software resources and that provides common services for software programs implemented within user device 802, (ii) a voice parser 814 configured to parse and extract content from voice communication(s) received at user device 802, (iii) a text parser 816 configured to parse and extract content from text or data communication(s) received at user device 802, (iv) a natural language parser 818 configured to parse and interpret natural language content that has been extracted from voice, text or data communication(s) received at user device 802, (v) an OTP validity determination controller 820 configured to determine a validity period associated with an OTP received at user device 802, (vi) a risk scoring controller 822 configured to generate a risk score representing a likelihood that a remote entity that is in communication with user device 802 is a fraudster or a malicious attacker, and to generate a risk decision based on the risk score, (vii) an alert generator 824 configured to generate and/or display or transmit one or more security alerts in response to a determination that a remote entity that is in communication with user device 802 is a fraudster or a malicious attacker, (viii) a call termination controller 826 configured to respond to a determination that a remote entity that is in communication with user device 802 is a fraudster or a malicious attacker, by terminating a voice communication or voice call between user device 802 and the remote entity, (ix) a security server interface 828 configured to enable user device 802 to download data from and upload data to a cloud based security server and (x) a whitelist and/or blacklist database configured to locally store whitelist(s) and/or blacklist(s) at user device 802.

It will be understood that user device 802 may be configured to implement one or more of the methods steps and process flows discussed above in connection with FIGS. 3A to 7.

With a view to explain an implementation of the present invention, a working example is discussed below, wherein a user initiates an electronic payment transaction through a mobile device. The working example in accordance with the present invention commences where the user mobile device receives an OTP corresponding to the initiated electronic payment transaction.

In a first use-case, the user mobile device is already participating in an active voice call when the OTP message is received on the user mobile device. In this first use-case, the user mobile device determines the validity period of the OTP, and further determines that there is at least one voice call that is ongoing within the validity period of the OTP. The user mobile device responds to this determination by analyzing the parameters of the voice call and/or the calling number to determine whether the voice call is likely to have been initiated by or involve a malicious attacker and/or fraudster, and if so, further responds by initiating an appropriate risk mitigation procedure, such as generating an alert or terminating the voice call.

In a second scenario, the user mobile device receives a new voice call after the OTP message has been received but within a validity period of the received OTP. The user mobile device responds by analyzing parameters corresponding to the received voice call based on one or more data models, checking if the calling number is a number that the user has previously saved or called, and/or checking if the calling number is a blacklisted number. In the event the calling number is deemed to present a likelihood or risk of having been initiated by a malicious attacker or fraudster, the user mobile device marks the call as suspicious and may initiate an appropriate risk mitigation procedure, such as generating an alert or terminating the voice call.

In a third scenario, a user mobile device receives an OTP message associated with an initiated electronic payment transaction, and detects that a user operating the user mobile device is trying to send out a text or data message from the user mobile device to a remote entity, within a validity period of the received OTP. The user mobile device responds by analyzing parameters corresponding to the remote entity based on one or more data models, checking if a number or identifier associated with the remote entity is a number or identifier that the user has previously saved and/or called, and/or communicated with, and checking if the remote entity is blacklisted. In the event the remote entity is deemed to present a likelihood or risk of being operated or controlled by a malicious attacker or fraudster, the user mobile device marks the remote entity as suspicious and may initiate an appropriate risk mitigation procedure, such as generating an alert or blocking the data message sought to be transmitted from the user device to the remote entity.

Figure 9:
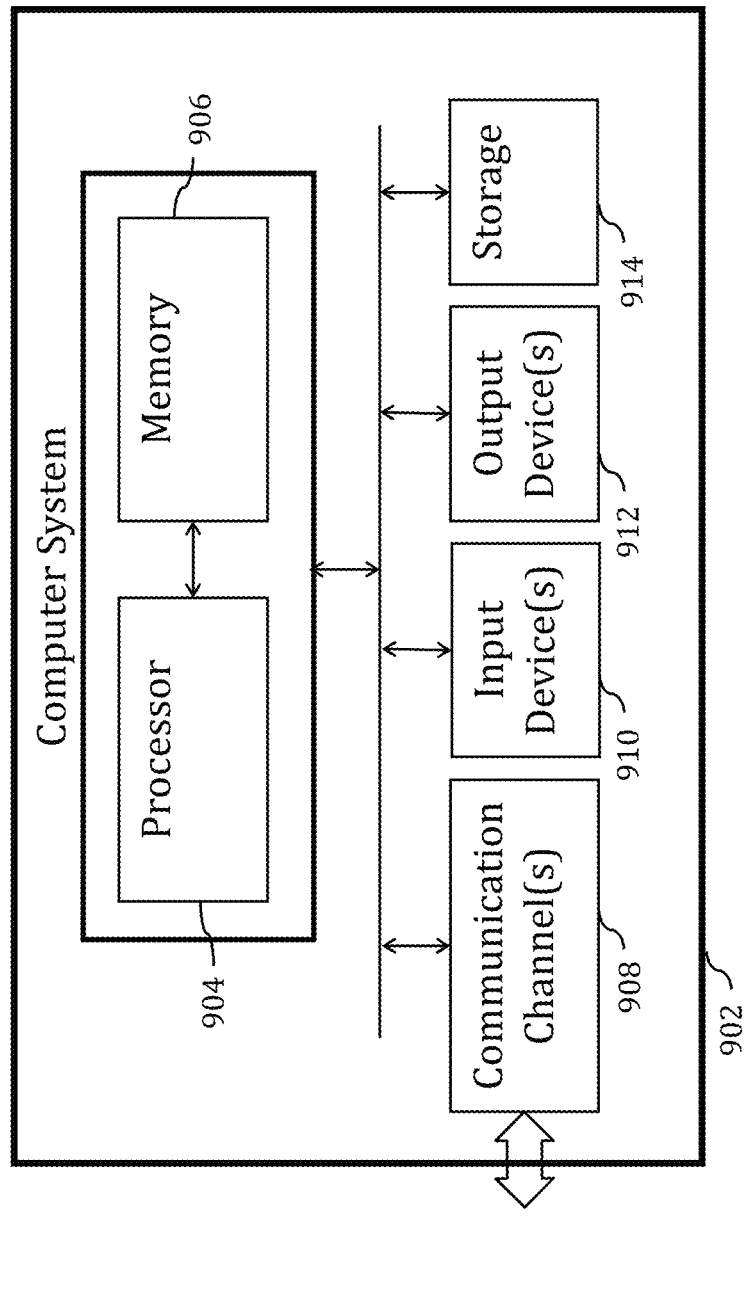
FIG. 9 illustrates an exemplary computer system of a type that may be used to implement the teachings of the present invention.

FIG. 9 illustrates an exemplary computer system of a type that may be used to implement the teachings of the present invention.

Computer system 902 includes one or more processors 904 and at least one memory 906. Processor 904 is configured to execute program instructions. Further, processor 904 may be a real processor or a virtual processor. It will be understood that computer system 902 does not suggest any limitation as to scope of use or functionality of described embodiments. The computer system 902 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 902 in accordance with the present invention may include one or more servers, desktops, laptops, tablets, smart phones, mobile phones, mobile communication devices, tablets, phablets and personal digital assistants. In an embodiment of the present invention, the memory 906 may store software for implementing various embodiments of the present invention. The computer system 902 may have additional components. For example, the computer system 902 may include one or more communication channels 908, one or more input devices 910, one or more output devices 912, and storage 914. An interconnection mechanism (not shown) such as a bus, controller, or network, interconnects the components of the computer system 902. In various embodiments of the present invention, operating system software (not shown) provides an operating environment for various softwares executing in the computer system 902 using a processor 904, and manages different functionalities of the components of the computer system 902.

The communication channel(s) 908 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 910 may include, but is not limited to, a touch screen, a keyboard, mouse, pen, joystick, trackball, a voice device, a scanning device, or any another device that is capable of providing input to the computer system 902. In an embodiment of the present invention, the input device(s) 910 may be a sound card or similar device that accepts audio input in analog or digital form. The output device(s) 912 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 902.

The storage 914 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 902. In various embodiments of the present invention, the storage 914 may contain program instructions for implementing any of the described embodiments.

In an embodiment of the present invention, the computer system 902 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 902. The method described herein is typically implemented as a computer program product, including a set of program instructions that is executed by the computer system 902 or any other similar device. The set of program instructions may be a series of computer readable codes stored on a tangible medium, such as a computer readable storage medium (storage 914), for example, diskette, CD-ROM, ROM, flash drives or hard disk, or transmittable to the computer system 902, via a modem or other interface device, over either a tangible medium, including but not limited to optical or analogue communications channel(s) 908. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The advantages presented by the above described invention are several, and immediately apparent. Such advantages include:

Alerting a user to the likelihood that a remote entity is operated by a fraudster, and thereby allowing the user to take a considered decision on whether to further communicate with the remote entity;

Provide machine learning based data models that can be generated based on aggregate data received from multiple user devices, and which data models can accordingly be periodically updated and made available for download by user devices and Providing an interface with an issuer platform, wherein the issuer platform receives intimation of suspicious activity by a remote entity, and can block any further communications with or transaction payments involving such remote entity.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

We claim:

1. A method for securing electronic transaction one-time-passwords (OTPs) against phishing attacks, comprising implementing at a terminal device, the steps of:
   generating, modifying, and refining one or more risk scoring data models based on one or more machine learning algorithms that identify correlations between financial terms, keywords, or other content within one or more previously received data communications, and whether a prior remote entity corresponding to the one or more previously received data communications has been identified as a malicious attacker;
   receiving at the terminal device, a first data communication comprising an OTP associated with a requested electronic transaction;
   identifying a validity period associated with the OTP;
   receiving at the terminal device, during the identified validity period associated with the OTP, a second data communication from a remote entity;
   detecting that the second data communication is received during the identified validity period associated with the OTP;
   in response to detecting that the second data communication is received during the identified validity period associated with the OTP, extracting content from the second data communication;
   analyzing the extracted content by using the one or more risk scoring data models that have been generated, modified, or refined by the one or more machine learning algorithms;
   generating a risk decision based on output of the analysis of the extracted content, wherein the risk decision determines whether the remote entity comprises, or is controlled by, the malicious attacker; and
   responsive to the risk decision determining that the remote entity comprises, or is controlled by, the malicious attacker, initiating a risk mitigation process.

2. The method as claimed in claim 1, wherein the validity period associated with the OTP is a time period within which the OTP is capable of identity authentication for the requested electronic transaction.

3. The method as claimed in claim 1, wherein the validity period associated with the OTP is determined based on content of the first data communication.

4. The method as claimed in claim 1, wherein analyzing the content extracted from the second data communication by using the one or more risk scoring data models that have been generated, modified, or refined based on one or more machine learning algorithms comprises presenting the extracted content as input to the one or more risk scoring data models that are configured to score a likelihood that the remote entity comprises, or is controlled by, a malicious attacker,
   wherein the extracted content is analyzed against the one or more risk scoring data models for terms relating to financial transactions, electronic transactions, and payment transactions and whether the extracted content includes terms used in the one or more previously received data communications that have been identified as the malicious attacker.

5. The method as claimed in claim 1, wherein the risk mitigation process comprises any of:
   initiating a display of a security threat alert on a display of the terminal device;
   initiating transmission of a security threat alert to an issuer server involved in the electronic transaction;
   terminating the electronic transaction;
   invalidating the received OTP;
   terminating communication between the terminal device and the remote entity;
   adding the remote entity to a blacklist; and
   updating the one or more risk scoring data models based on parameters of the second data communication.

6. A system for securing electronic transaction one-time-passwords (OTPs) against phishing attacks, comprising a terminal device configured for implementing the steps of:
   generating, modifying, and refining one or more risk scoring data models based on one or more machine learning algorithms that identify correlations between financial terms, keywords, or other content within one or more previously received data communications, and whether a prior remote entity corresponding to the one or more previously received data communications has been identified as a malicious attacker;
   receiving at the terminal device, a first data communication comprising an OTP associated with a requested electronic transaction;
   identifying a validity period associated with the OTP;
   receiving at the terminal device, during the identified validity period associated with the OTP, a second data communication from a remote entity;
   detecting that the second data communication is received during the identified validity period associated with the OTP;
   in response to detecting that the second data communication is received during the identified validity period associated with the OTP, extracting content from the second data communication;
   analyzing the extracted content by using the one or more risk scoring data models that have been generated, modified, or refined by the one or more machine learning algorithms;
   generating a risk decision based on output of the analysis of the extracted content, wherein the risk decision determines whether the remote entity comprises, or is controlled by, the malicious attacker; and responsive to the risk decision determining that the remote entity comprises, or is controlled by, the malicious attacker, initiating a risk mitigation process.

7. The system as claimed in claim 6, wherein the validity period associated with the OTP is a time period within which the OTP is capable of identity authentication for the requested electronic transaction.

8. The system as claimed in claim 6, wherein the validity period associated with the OTP is determined based on content of the first data communication.

9. The system as claimed in claim 6, wherein analyzing the content extracted from the second data communication by using the one or more risk scoring data models that have been generated, modified, or refined based on one or more machine learning algorithms comprises presenting the extracted content as input to the one or more risk scoring data models that are configured to score a likelihood that the remote entity comprises, or is controlled by, a malicious attacker, wherein the extracted content is analyzed against the one or more risk scoring data models for terms relating to financial transactions, electronic transactions, and payment transactions and whether the extracted content includes terms used in the one or more previously received data communications that have been identified as the malicious attacker.

10. The system as claimed in claim 6, wherein the risk mitigation process comprises any of:

initiating a display of a security threat alert on a display of the terminal device;

initiating transmission of a security threat alert to an issuer server involved in the electronic transaction;

terminating the electronic transaction;

invalidating the received OTP;

terminating communication between the terminal device and the remote entity;

adding the remote entity to a blacklist; and updating the one or more risk scoring data models based on parameters of the second data communication.

11. A computer program product for securing electronic transaction one-time-passwords (OTPs) against phishing attacks, comprising a non-transitory computer readable medium having a computer readable program code embodied therein, the computer readable program code comprising instructions for:

generating, modifying, and refining one or more risk scoring data models based on one or more machine learning algorithms that identify correlations between financial terms, keywords, or other content within one or more previously received data communications, and whether a prior remote entity corresponding to the one or more previously received data communications has been identified as a malicious attacker;

receiving at a terminal device, a first data communication comprising an OTP associated with a requested electronic transaction;

identifying a validity period associated with the OTP;

receiving at the terminal device, during the identified validity period associated with the OTP, a second data communication from a remote entity;

detecting that the second data communication is received during the identified validity period associated with the OTP;

in response to detecting that the second data communication is received during the identified validity period associated with the OTP, extracting content from the second data communication;

analyzing the extracted content by using the one or more risk scoring data models that have been generated, modified, or refined by the machine learning algorithms;

generating a risk decision based on output of the analysis of the extracted content, wherein the risk decision determines whether the remote entity comprises, or is controlled by, the malicious attacker; and responsive to the risk decision determining that the remote entity comprises, or is controlled by, the malicious attacker, initiating a risk mitigation process.

12. The computer program product as claimed in claim 11, wherein analyzing the content extracted from the second data communication by using the one or more risk scoring data models that have been generated, modified, or refined based on one or more machine learning algorithms comprises presenting the extracted content as input to the one or more risk scoring data models that are configured to score a likelihood that the remote entity comprises, or is controlled by, a malicious attacker, wherein the extracted content is analyzed against the one or more risk scoring data models for terms relating to financial transactions, electronic transactions, and payment transactions and whether the extracted content includes terms used in the one or more previously received data communications that have been identified as the malicious attacker.

\* \* \* \* \*